METHOD OF EVAPORATING HEAT SENSITIVE LIQUIDS

Original Filed Sept. 1, 1970

United States Patent Office 3,796,808

Patented Mar. 12, 1974

1

3,796,808
METHOD OF EVAPORATING HEAT SENSITIVE LIQUIDS

Peter Antonelli, Ashford, and Roy Herbert Seager, Maidstone, England, assignors to Tullamore S.A., Geneva, Switzerland Continuation of application Ser. No. 68,729, Sept. 1, 1970. This application Sept. 5, 1972, Ser. No. 286,252

Int. Cl. A23g *3/00*

U.S. Cl. 426—492 2 Claims

ABSTRACT OF THE DISCLOSURE

A method of continuously producing a solid confectionery from an 80% solids sugar solution by heating the solution and immediately passing it through a tubular evaporator in less than one second and subsequently cooling the confection.

This is a continuation of application Ser. No. 68,729 filed Sept. 1, 1970 now abandoned.

This invention relates to method of evaporating liquids from heat sensitive liquid materials, i.e., materials which become degraded when subjected to excess heating, and especially, but not solely, for the purpose of evaporating moisture from a liquid mixture of ingredients during the manufacture of boiled-sugar confectionery, especially toffee, caramel, hard-boiled sugar sweets and jellies.

In one well known process, toffee is made with sugar, glucose, milk, fat, salt and flavouring and these ingredients are mixed to form a syrup. The syrup is then heated to about 200° F., whilst stirring, whereby the sugar dissolves in the moisture of the milk and the glucose. The next step is to place the thus processed mixture in an evaporator which comprises an open vessel surrounded by a steam jacket in order to drive off a desired amount of the moisture content.

The process described enables batches of toffee to be produced. It should be noted that the mixture concerned is heat sensitive in that it will degrade if held for a significant period at elevated temperatures.

Proposals have been made for the continuous evaporation of moisture and one form of continuous evaporator known as the climbing or falling film evaporator passes the material through the tube of a heat exchanger. However, it has been found that toffee syrup adheres to the walls of the tube due to the fact that the steam produced as a result of the contact of the material with the tube walls flows radially inwardly through the material and combines to form a column of steam, which holds the material as a film against the walls. As a result of this, material degrades and burnt particles enter the material mass. These tubes were three-eighths inch or more diameter. It was therefore proposed to provide mechanical scrapers for the walls of the vessel, but this has the disadvantage that it is necessary to keep the fat and milk content low in order to reduce burning, so that inferior toffee was produced. It was also unsatisfactory in that the scraper blades themselves become coated with burnt material which degraded the material mass.

It is now proposed, according to the invention, to provide a method of continuously evaporating a liquid from a heat sensitive liquid material, in which the material is passed through at least one passage having heated walls, the spacing between such walls being so small that the liquid vapor bubbles formed within the material serve to maintain a foam of vapor and material throughout the cross-section of each passage.

The precise spacing of the walls is selected according to associated characteristics including viscosity, surface tension, adhesiveness, residence time of the material, temperature at which the material degrades and the pressure drop along the passage.

2

It has surprisingly been found that by using passages of sufficiently small spacing, according to the associated characteristic, the vapor generated does not pass through the material to form a central column, but instead the liquid vapor bubbles formed within the material form a foam of vapor and material throughout the cross-section of the passage. This has the effect of causing considerable turbulence within the passage so that the material has insufficient time against a particular section of the heated wall to be degraded thereby. Furthermore, since the bubbles wholly or mainly, remain intact, they have a further tendency to sweep the wall of the tube again preventing the material from remaining from a sufficient period of time to become degraded.

In a preferred arrangement, the material is passed through a heat exchanger having a batch of tubes, the inside diameter of which is so small that the liquid vapor bubbles formed within the material remain intact and maintain a foam of vapor material throughout the cross-section of each tube. Thus, there is no central column or core of vapor. If the material being treated is that used in the production of boiled sugar confectionery, such as toffees, the liquid will be water and the vapor steam. In practice the diameter of the tubes may be judged by making it so small that degradation does not occur to an unacceptable degree.

An example of apparatus for carrying out the method of the present invention will now be described by way of example, with reference to the accompanying drawing, in which.

Figure 1:
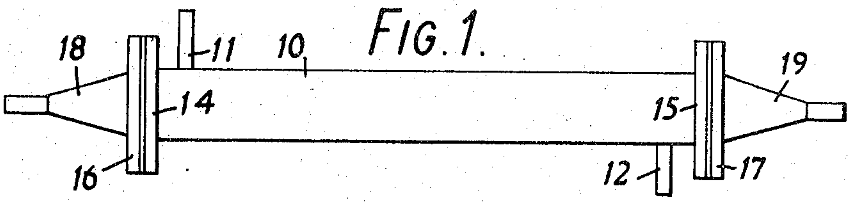
FIG. 1 shows an elevation of the heat exchanger.
Figure 2:
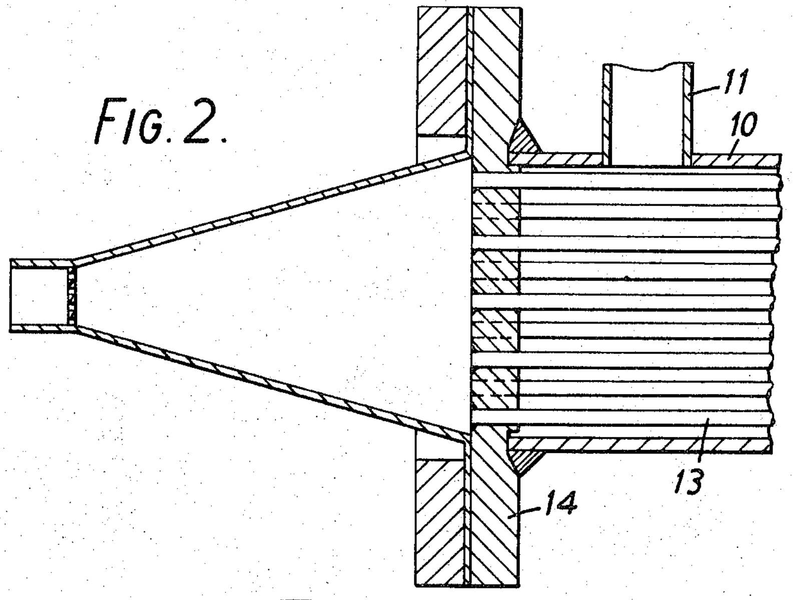
FIG. 2 shows a part sectional view along the longitudinal axis of one end of the heat exchanger on an enlarged scale.
Figure 3:
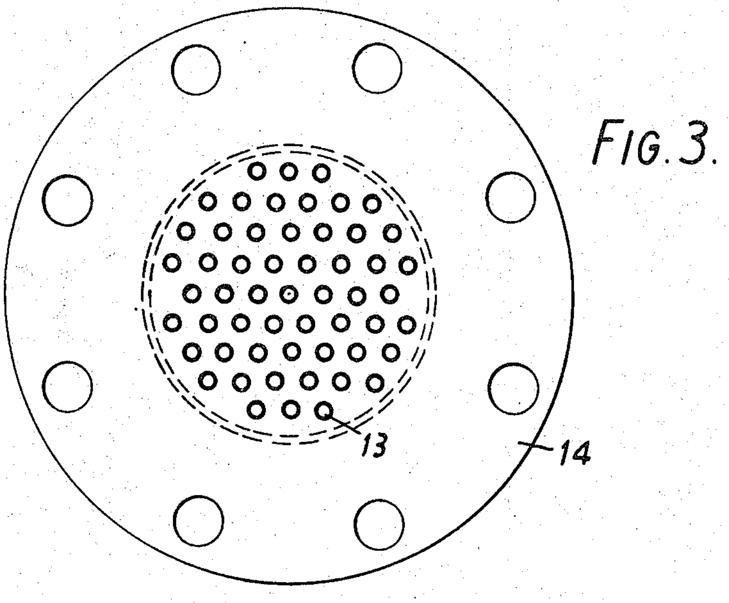
FIG. 3 shows an end elevation with the inlet nozzle removed.

As shown in the drawing, the heat exchanger comprises a cylindrical jacket 10 having steam inlet and outlet ports 11, 12. The jacket contains a nest of tubes 13 (55 in all) carried between end plates 14, 15 to which they are welded. The jacket is welded to the plates 14, 15. Annular plates 16, 17 serve to secure conical inlet and outlet nozzles 18, 19 to the ends of the jacket by way of flanges formed on the nozzles. The plates 16, 17 are bolted to the plates 14, 15. In this example, the tubes have an internal diameter of three-sixteenths of an inch and a length of three feet. The overall diameter of the jacket is four and a half inches. These dimensions are suitable for material made up of the following constituents:

| | Percent |
|---|---|
| Sugar/glucose (1:1.2) | 56.5 |
| Milk solids, not fat | 7.0 |
| Fat | 20.0 |
| Salt | 0.5 |
| Moisture | 16.0 |

The mixture is fed by a gear pump into the inlet nozzle at a constant rate and at a temperature of about 180° F. and leaves the outlet nozzle at a temperature of about 260° F. The steam is supplied to the jacket at about 100 p.s.i. and the material is processed at 8.5 lbs. per minute, the inlet feed pressure being about 40 p.s.i., the material at the outlet being at atmospheric pressure. The material flows through each tube in less than one second.

The product is tested by the well known "crack test" and the temperature of the material is adjusted to obtain the required characteristics of the product. The temperature is adjusted by varying the pressure of the steam supply by a suitable valve (not shown).

The tube diameter is critical and a particular upper limit of diameter can be defined for a given set of conditions, such that the flow which takes place within the tube is mass flow of steam and liquid mixture rather than the partial or completely separate flow of liquid film on the tube walls with steam flow along the tube center, which would result from the use of a larger bore. In other words, the bubbles of vapor, in this instance steam, remain intact and do not separate from the mixture. By remaining intact the foam of steam and the remaining material is maintained throughout the cross-section of each tube. Thus a considerable turbulence is formed within each tube, and bubbles of steam act in effect as pistons which sweep along the tube from the inlet to the outlet, cleaning the remaining material from the tube walls, so that there is no tendency to burn.

To illusrate the critical nature of the tube diameter, in one set of tests a diameter of one quarter of an inch gave satisfactory results, whereas tubes having a five sixteenths of an inch internal diameter resulted in steam channelling and burning of the mixture on the tube walls. It was found that tubes of three-eights inch internal diameter and over were entirely impracticable. In the one quarter inch tubes (glass tubes) the liquid mixture could be seen to be in the form of a foam, while with the larger diameter tubes the steam formed channels through the mixture, leaving the liquid mixture substantially free from bubbles, the mixture therefore residing on the tube walls for sufficient time to allow a certain degree of burning.

The tube length and diameter are chosen in relation to the characteristics of the material such as viscosity to ensure the mass flow, i.e. the continuous flow of the mass of material and vapor throughout the tube. Any number of tubes may be incorporated into a complete heat exchanger to provide the required product throughout. The tubes need not be straight tubes but could be curved, e.g. U-shaped. The tubes need not be round tubes, but could be of any construction providing passages of small cross-section.

The advantages are that the above mentioned mass flow ensures that the product cannot reside on the tube walls. Any such sticking even in part would result in uneven coloration, and in extreme cases, degradation would result. Residence time is short and the process therefore controlled with ease. For this reason also, degradation is avoided.

The mechanical construction is simple, there being no moving parts in the tubes to create unreliability.

While the tubes are preferably all located in a common heating chamber, it is possible to surround each tube separately with its individual heating chamber. For most purposes in which moisture is evaporated from boiled sugar confectionery, the diameter of the tubes will be from 0.15 to 0.4 inch, with a length of 2 to 4 feet. The tubes may be made of glass, stainless steel, copper or other material.

In the foregoing description, reference has been made to the use of a tube-type heat exchanger. Other means may be provided for heating the tubes such as direct electrical heating.

A further example of a material which can be usefully treated by the present invention is a mixture of sugar (sucrose) and glucose, e.g. 50/50 mixture with enough water to dissolve the sugar and glucose or other proportions commonly used. The normal treatment is to boil the material at about 295° F. maximum under a vacuum of 15 inches Hg. If the material is treated by the present invention, it is found that a crisper solid product can be obtained evidently due to the higher temperature and significantly less period of time and absence of vacuum.

While the invention has been specifically described with reference to the removal of moisture from liquid mixtures of ingredients during the manufacture of boiled sugar confectionery, it is not restricted to this use. It can be applied to any process in which it is necessary to remove a liquid from a mixture in which the other ingredients of the mixture would degrade during the heating necessary to effect the evaporation to remove the liquid.

We claim:

1. A method of continuously producing a solid confectionery material from a mixture of at least 80% solids of which at least 50% is sugars and water comprising: heating said mixture to at least 180° F. to form a sugar solution; immediately passing the heated liquid mixture in a single nonrecycle pass through a nest of tubes in parallel arrangement, the walls of which are heated to a temperature which is so high as would cause spoiling of the material by overheating if the material were to remain at that temperature, the tubes being within the range of between two and four feet in length and in the range between .15 and .4 inch across internally so that liquid vapor bubbles formed within the mixture in the tubes serve to maintain a foam of vapor and liquid material throughout the cross-section of each tube passage, maintaining the rate of flow of the material such that the residence time of the material in the entire tube passage is less than one second and reaches a temperature of over 250° F.; and thereafter permitting the liquid material leaving the tubes to cool to a solid sugar confectionery material at room temperature.

2. A method as claimed in claim 1 wherein the material is passed through a header into the nest of tubes and out of an outlet header.

References Cited

UNITED STATES PATENTS

| | | | |
|---|---|---|---|
| 3,073,380 | 1/1963 | Palmason | 159—28 R |
| 2,732,008 | 1/1956 | Seely | 159—28 D |

FOREIGN PATENTS

| | | |
|---|---|---|
| 835,645 | 5/1960 | Great Britain. |

A. LOUIS MONACELL, Primary Examiner
J. M. HUNTER, Assistant Examiner

U.S. Cl. X.R.

126—520